US008161534B2

(12) United States Patent
Golle et al.

(10) Patent No.: US 8,161,534 B2
(45) Date of Patent: Apr. 17, 2012

(54) AUTHENTICATING USERS WITH MEMORABLE PERSONAL QUESTIONS

(75) Inventors: Philippe J. P. Golle, San Francisco, CA (US); Bjorn Markus Jakobsson, Mountain View, CA (US); Richard Chow, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 758 days.

(21) Appl. No.: 12/270,154

(22) Filed: Nov. 13, 2008

(65) Prior Publication Data
US 2010/0122341 A1 May 13, 2010

(51) Int. Cl.
*G06F 7/04* (2006.01)

(52) U.S. Cl. ............ 726/6; 726/2; 726/18; 726/19; 726/27; 369/26.01; 369/30.11; 709/206; 709/219; 709/229; 713/156; 713/166; 713/168; 713/179; 713/184; 713/170; 713/182

(58) Field of Classification Search ............ 726/6
See application file for complete search history.

(56) References Cited

U.S. PATENT DOCUMENTS

| 5,227,874 | A * | 7/1993 | Von Kohorn ............ 705/7.32 |
| 5,768,578 | A * | 6/1998 | Kirk et al. ............... 1/1 |
| 5,995,961 | A * | 11/1999 | Levy et al. ............... 1/1 |
| 7,346,930 | B1 * | 3/2008 | Boydstun et al. ......... 726/29 |
| 2002/0143655 | A1 * | 10/2002 | Elston et al. ............ 705/26 |
| 2003/0105959 | A1 * | 6/2003 | Matyas et al. ........... 713/168 |
| 2005/0044357 | A1 * | 2/2005 | Fano ..................... 713/164 |
| 2007/0083505 | A1 * | 4/2007 | Ferrari et al. ........... 707/5 |
| 2007/0107051 | A1 * | 5/2007 | Carter ................... 726/21 |
| 2008/0005037 | A1 * | 1/2008 | Hammad et al. ........... 705/67 |
| 2008/0115141 | A1 * | 5/2008 | Welingkar et al. ........ 718/104 |
| 2008/0261680 | A1 * | 10/2008 | Buecheler et al. ........ 463/23 |
| 2009/0265229 | A1 * | 10/2009 | Sidhu ................... 705/14 |

OTHER PUBLICATIONS

Indiana University, "Password Questions Display Characteristics Feb. 28, 2001", retrieved Jan. 17, 2005.*
Jakobsson et al., "Quantifying the Security of Preference-based Authentication", 2008.*
M.Jakobsson, L. Yang, and S. Wetzel. "Quantifying the Security of Preference-Based Authentication." DIM '08.
M.Jakobsson, E. Stolterman, S. Wetzel, and L. Yaang "Love and Authentication", In Proceedings of ACM Human/ Computer Interaction Conf. (CHI), 2008.

* cited by examiner

*Primary Examiner* — Krista Zele
*Assistant Examiner* — Ondrej Vostal
(74) *Attorney, Agent, or Firm* — Shun Yao; Park, Vaughan, Fleming & Dowler LLP

(57) ABSTRACT

One embodiment provides a system that verifies a user's identity. The system generates a list including a plurality of items and formulates a substantially large set of security questions base on the plurality of items. The number of questions in the set is significantly larger than a subset of security questions presented to the user to reduce the likelihood of the same questions being asked repeatedly. During account creation, the system presents to the user the subset of questions, and receives and stores a response from the user. At least one question in the subset is selected based on user information that is automatically extracted from devices associated with the user. Subsequently, the system receives a request to reset the user's password and presents the subset of questions to the requester. The system determines whether the requester is the user by comparing the requester's response with the stored user response.

18 Claims, 4 Drawing Sheets

AUTHENTICATING USERS WITH MEMORABLE PERSONAL QUESTIONS

BACKGROUND

1. Field of the Invention

The present disclosure relates to verification of user identity. More specifically, the present disclosure relates to verification of user identity using memorable personal questions.

2. Related Art

The increased popularity of the Internet has changed modern life significantly. Many conventional activities have been transferred to the Internet. Internet users use the Internet to conduct daily activities such as shopping, banking, and even social activities. For reasons of security and confidentiality, when using a web service, a user is often required by the website to set up a password-protected user account.

However, once in a while a user may forget the password for his account and will need the website to reset the password. Before the website resets a user's password, the website verifies the identity of the user. In order to facilitate user identity verification, when setting up an account, a user is often required to manually input answers to a set of simple personal questions, sometimes referred to as security questions or challenges. For example, the user may need to input his mother's maiden name, the name of his childhood pet, or the name of the high school he graduated from. Such information is then stored in the user's profile. When the user requests password resetting, the website will ask him the same set of questions. By comparing the user's instant answer with information stored in his profile, the website can determine if the user requesting the password resetting is indeed the original user who set up the account.

Currently, the questions asked by websites for user authentication are often drawn from a very small question space, with the same questions used for authentication of entities with different levels of trustworthiness. Therefore, it is possible for an attacker to collect a user's answers to the security questions from one place and use the same answers at a different place to impersonate the user.

To avoid such a problem, it is desirable to ask a user security questions drawn from a large question space that includes a great variety of questions. However, the answers to a large number of questions may be difficult to remember for the user.

Hence, what is needed is a method that verifies a user's identity with a high level of confidence without burdening the user with many difficult-to-remember answers.

SUMMARY

One embodiment of the present invention provides a system that verifies a user's identity. During operation, the system generates a list which includes a plurality of items. The system then formulates a substantially large set of security questions to ask the user regarding the user's experience and/or preference related to the plurality of items. The number of security questions in the set is significantly larger than a subset of security questions presented to the user to reduce the likelihood of the same questions being asked repeatedly. During an account creation process, the system presents to the user the subset of security questions, and receives and stores a response from the user to the subset of questions. At least one question in the subset is selected based on user information that is automatically extracted from devices associated with the user without explicitly requiring the user to input user information manually. Subsequently, the system receives a request to reset the user's password. In response, the system presents the subset of security questions to the requester, receives a response from the requester to the subset of questions, and determines whether the requester is the user by comparing the requester's response with the stored user response.

In a variation on this embodiment, the list includes a plurality of activities, wherein the set of security questions includes questions on whether the user has engaged in one or more of the plurality of activities.

In a further variation, the plurality of activities include sport and outdoor activities.

In a variation on this embodiment, the list includes a plurality of places, wherein the set of questions include questions on whether the user has visited one or more of the plurality of places.

In a variation on this embodiment, the list includes a plurality of abstract classes, wherein the set of security questions include questions to ask the user to name canonical representatives of one or more of the abstract classes.

In a variation on this embodiment, the list includes a plurality of categories, wherein each category includes at least two items, and wherein the set of security questions include questions to ask the user to order the items based on the user's preference.

In a further variation, the plurality of categories include one or more of: food, sport, music, and outdoor activities.

In a variation on this embodiment, the method further includes allowing the user to select the subset of security questions.

DETAILED DESCRIPTION

Figure 1:
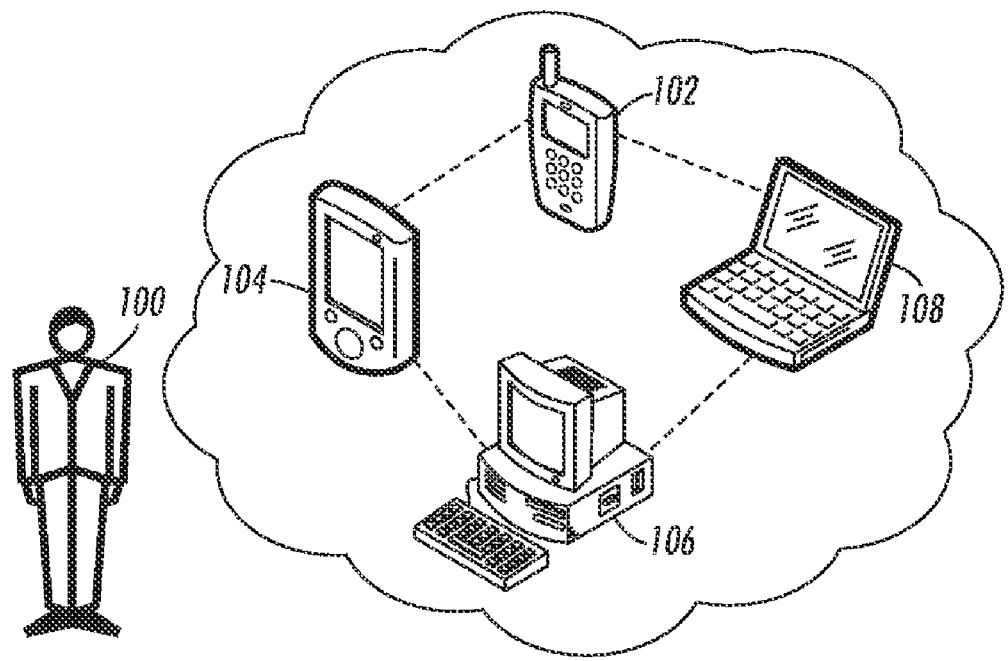
FIG. 1 illustrates a user and his associated computer devices in accordance with one embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a method for verifying user identity. A large number of questions are first generated as security questions, which have easy-to remember answers. During registration, a user is asked to answer a subset of these questions.

Experience Question

In one embodiment, the system that manages user accounts generates one class of questions which involves a user's past experience. Examples of a user's past experience include activities engaged in and places visited. In one embodiment of the present invention, questions have the format of "Have you ever done X?" where "X" presents an activity that a user may have engaged in. Questions can also have the format of "Have you ever been to Y?" where "Y" represents a place that a user may have visited.

There is an almost unlimited number of choices for X and Y. Examples of user activities can range from common ones, such as driving a car or riding the subway, to unusual ones, such as bungee jumping or parachuting. In one embodiment, user activities include sports and outdoor activities. Examples of user-activity-related questions include "Have you ever played golf?" and "Have you ever been rock climbing?" Similarly, possible places visited by users can range from generic ones, such as New York or Paris, to exotic ones, such as on safari or to the Amazon.

In order to facilitate user identity verification, the entity that manages the user account (for example, a web service provider) can generate hundreds, even thousands, of questions using a wide range of activities and places to form a substantially large question space. When a user applies for an account, the user-account-managing entity selects a subset of questions from a large question space to ask the user and stores the user's answers. Later, during password resetting, the user will be asked the same subset of questions. If the user's replies are the same as or similar to the stored answers, the system validates the user's identity and resets the password.

In one embodiment, a user is allowed to select the subset of questions from the large question space. For example, a user with ample outdoor experience may choose to be asked questions related to his outdoor experience, and a user who has visited many places in Europe may choose to be asked questions related to places in Europe. This way, the user can ensure that the security questions have answers that are memorable to him.

In another embodiment, the entity that manages the user account automatically extracts user information from computer devices associated with the user and selects the subset of questions based on extracted user information. FIG. 1 illustrates a user 100 and his associated computer devices including a mobile phone 102, a personal digital assistant (PDA) 104, a desktop computer 106, and a laptop computer 108. In one embodiment, mobile phone 102 can be a smart phone. Based on the GPS traces recorded by the user 100's mobile devices, such as mobile phone 102 and PDA 104, the user-account-managing entity can automatically obtain user information regarding places visited by user 100. In addition, a wi-fi hotspot or a network with which user 100's computer devices communicate can also provide information to places visited by user 100.

Besides places visited by user 100, the user-account-managing entity can further extract information regarding user 100's past activities. For example, a calendar entry on user 100's PDA 104 shows a weekly appointment for rock climbing. As a result, the user-account-managing entity can conclude that user 100 has been engaged in the activity of rock climbing.

Note that the user information is extracted from computer devices associated with the user by the user-account-managing entity automatically. The user-account-managing entity does not explicitly ask the user to input the user information manually, therefore not burdening the user. Being able to select a subset of questions based on extracted user information allows the user-account-managing entity to select questions that pertain to the user.

Although a user may not remember all his past experiences, answers to questions like "Have you ever done X?" and "Have you ever been to Y?" are very memorable. In one embodiment, a user is not required to remember details regarding his experiences, such as when, how, or how many times, but only to remember whether he has experienced X or Y. It is hard to imagine that, for example, someone completely forgets participating in a sport or visiting a place.

The answers to the experience type of questions may change over time, because a user's experience may change. For example, while setting up an account, a user answered "no" to the question "Have you even been to Paris?," and one year later, when requesting password resetting, the user answers "yes" to the same question, because he has visited Paris during the past year. However, it is impossible for a user to change his answer from a "yes" to a "no." The system can be set up in a way to tolerate some changes in a user's reply to the experience questions, as long as it is changed from a "no" to a "yes." However, a change from a "yes" to a "no" may invalidate the user.

Being able to draw a subset of questions from a large question space eliminates the threat of reusing the same questions. Under different instances, such as requesting different web services, the user is asked with different subsets of questions drawn from the large question space. Therefore, even if an attacker somehow obtains a user's answers to one subset of questions, he cannot apply the same answers to impersonate the user at a different place, where a different subset of questions is asked.

Class Representative Question

Another type of question involves how a user chooses a canonical representative of an abstract class. In other words, a user is asked to name a member of an abstract class that is the canonical representative of the class. This type of question can be formulated as "When you think of X, do you think of A or B or C?" X is the name of an abstract class, and A, B, and C are members belonging to class X.

In one embodiment, the abstract classes include types of food. For example, a question can be "When you think of Mexican food, do you think of tacos, burritos, or fajitas?" or "When you think of Italian food, do you think of pizza, pasta, or spaghetti?" Other examples of this type of question include the following format: "When you think of a racquet sport, do you think of tennis, badminton, or squash?" or "When you think of a mountain range, do you think of the Rockies, the Sierras, or the Alps?"

Questions based on a class representative can also be open ended. Instead of asking a user to choose from a list which member he thinks represents the class, the system could ask the user to name his own representative. In one embodiment, a user is asked to finish the sentence "When you think of X, you think of . . . " Similarly to the experience type of questions, the account managing entity can generate many questions using this technique because the number of abstract classes can be substantially large.

Preference Profile Question

Another type of security question is related to a user's preference profile. A user's preference profile may include the user's preference order over a number of categories. Examples of categories include food, music, sport, and outdoor activities. In one embodiment of the present invention, during registration, a user can be asked to rank the following activities: listening to music, playing sport, travelling, and cooking, based on his preference.

In addition, a user's preference profile may also include the user's preference order over subjects within one category. In one embodiment of the present invention, a user is asked to rank the following types of food: Chinese, Thai, Italian, and German, based on his preference. In another embodiment, a user can be asked to rank the following genres of music: classical, pop, country, and jazz, based on his preference.

Note that once the user-account-managing entity obtains a user's preference hierarchy, more than one security question can be generated. For example, a user reports that he prefers Chinese food over Thai food, Italian food, and German food (in the same order). During password resetting, instead of asking the user to rank them again, the system may ask the user if he prefers Chinese food over German food, or if he prefers Italian food over Thai food.

A user's preference often stays stable over a long time period and is very memorable to the user, thus making it a good candidate for security questions. In addition, the abundance of possible categories and subjects within each category also makes it possible to generate a substantially large number of questions based on a user's preference profile.

Figure 2:
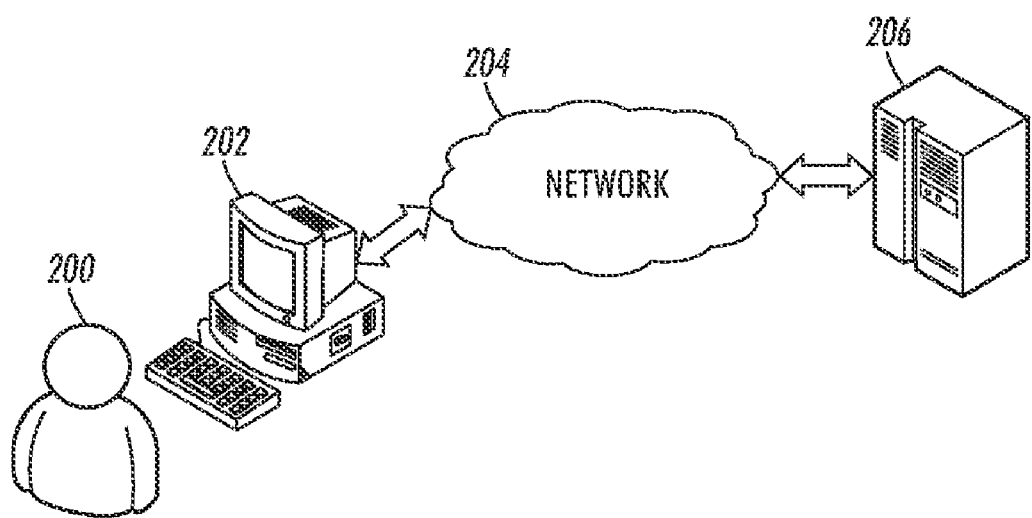
FIG. 2 illustrates an exemplary network for verifying user identity in accordance with one embodiment of the present invention.

FIG. 2 illustrates an exemplary networking environment for user identity verification in accordance with one embodiment of the present invention. In FIG. 2, a user 200 accesses his user account using his computer 202, which communicates with an user-account managing entity 206 over a network 204. Network 204 can generally include any type of wired or wireless communication channel capable of coupling together computing nodes. This includes, but is not limited to, a local area network, a wide area network, or a combination of networks. In one embodiment of the present invention, network 204 includes the Internet. User-account-managing entity 206 can be a server that provides a web service or an enterprise server.

Figure 3:
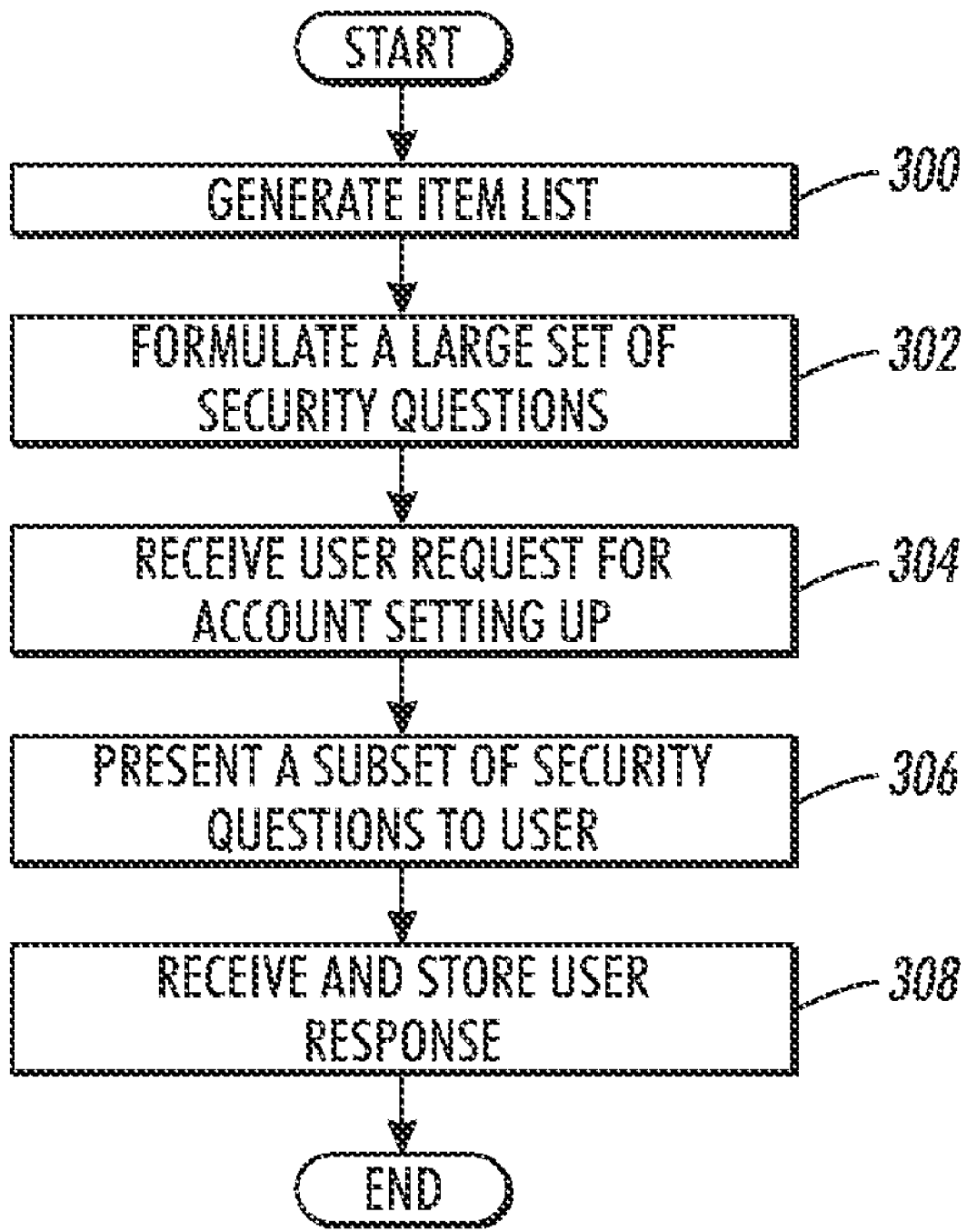
FIG. 3 presents an exemplary flow chart illustrating the process of generating and asking a user security questions when a user is setting up a user account in accordance with one embodiment of the present invention.

FIG. 3 presents an exemplary flow chart illustrating the process of generating and asking a user security questions when the user is setting up a user account in accordance with one embodiment of the present invention. During operation, the user-account-managing entity generates a list which includes a plurality of items (operation 300). Next, the user-account-managing entity formulates a large set of security questions to ask the user regarding the user's experience and/or preference related to the plurality of items (operation 302). Subsequently, the user-account-managing entity receives a user request for setting up an account (operation 304). In response, the user-account-managing entity presents a subset of the security questions to the user (operation 306). The user-account-managing entity then receives and stores user's response to the subset of the security questions (operation 308).

Figure 4:
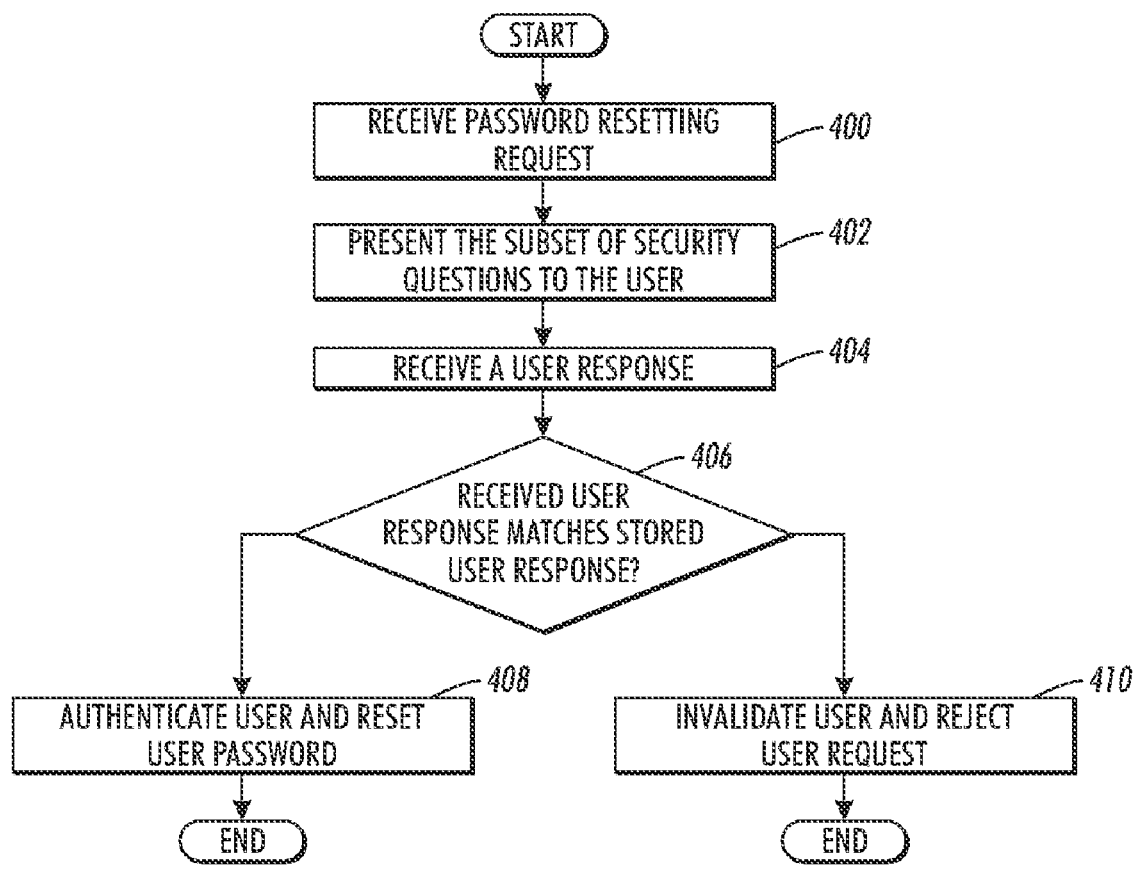
FIG. 4 presents an exemplary flow chart illustrating the process of verifying a user's identity and resetting a user password in accordance with one embodiment of the present invention.

FIG. 4 presents an exemplary flow chart illustrating the process of verifying a user's identity and resetting a user password in accordance with one embodiment of the present invention. During operation, the user-account-managing entity receives a user's request for password resetting (operation 400). In response, the user-account-managing entity presents the user the same subset of security questions that are asked to the user during account setting up (operation 402). The user-account-managing entity then receives the user's response (operation 404). The user-account-managing entity compares the received user response with the stored user response (operation 406). If the received user response matches the stored user response, the user-account-managing entity authenticates the user and resets the user password (operation 408). If not, the user-account-managing entity rejects the user's request (operation 410).

Figure 5:
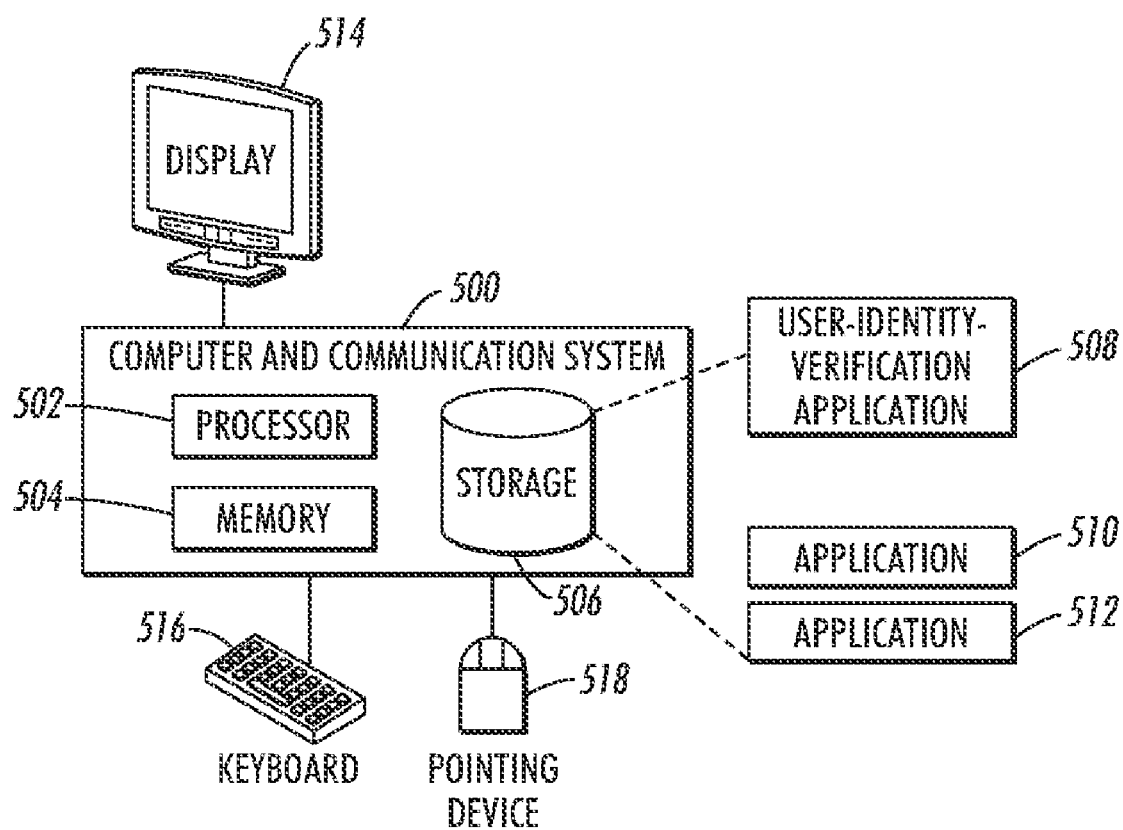
FIG. 5 illustrates an exemplary computer system for password resetting in accordance with one embodiment of the present invention.

FIG. 5 illustrates an exemplary computer system for password resetting in accordance with one embodiment of the present invention. In one embodiment, a computer and communication system 500 includes a processor 502, a memory 504, and a storage device 506. Storage device 506 stores a user-identity-verification application 508, as well as other applications, such as applications 510 and 512. In one embodiment, user-identity-verification application 508 further includes a program that facilitates the verification of user identity. During operation, user-identity-verification application 508 is loaded from storage device 506 into memory 504 and then executed by processor 502. While executing the program, processor 502 performs the aforementioned functions. Computer and communication system 500 is also coupled to an optional display 514, keyboard 516, and pointing device 518. Display 514, keyboard 516, and pointing device 518 can facilitate user identity verification.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for verifying user identity, the method comprising:
    extracting, by a computer, a user's information from devices associated with the user, without explicitly requiring the user to input the information manually;
    generating a security question corresponding to an activity the user has engaged in or a place visited by the user based on the extracted information;
    presenting to the user the security question and receiving and storing a response from the user;
    subsequently receiving a request to reset the user's password;
    presenting the security question to the requester;
    receiving a response from the requester to the question;
    comparing the requester's response with the stored user response;
    changing a stored negative response to an affirmative response, wherein the affirmative response is verified by updated extracted information indicating that the user has engaged in the activity or visited the place; and
    precluding any change to a stored positive response irrespective of the updated extracted information.

2. The method of claim 1, wherein the activity includes sport and outdoor activity.

3. The method of claim 1, further comprising generating a set of additional security questions, wherein the set of security questions includes asking the user to name canonical representatives of one or more of a plurality of abstract classes.

4. The method of claim 3, wherein the set of security questions includes asking the user to order at least two items in a category based on the user's preference.

5. The method of claim 4, wherein the category is in a plurality of categories, and wherein the plurality of categories includes one or more of:
food;
sport;
music; and
outdoor activities.

6. The method of claim 3, further comprising allowing the user to select the subset of security questions.

7. A computer-readable non-transitory storage medium storing instructions which when executed by a computer cause the computer to perform a method for verifying user identity, the method comprising:
extracting a user's information from devices associated with the user, without explicitly requiring the user to input the information manually;
generating a security question corresponding to an activity the user has engaged in or a place visited by the user based on the extracted information;
presenting to the user the security question and receiving and storing a response from the user;
subsequently receiving a request to reset the user's password;
presenting the security question to the requester;
receiving a response from the requester to the question;
comparing the requester's response with the stored user response;
changing a stored negative response to an affirmative response, wherein the affirmative response is verified by updated extracted information indicating that the user has engaged in the activity or visited the place; and
precluding any change to a stored positive response irrespective of the updated extracted information.

8. The computer-readable storage medium of claim 7, wherein the activity includes sport and outdoor activity.

9. The computer-readable storage medium of claim 7, wherein the method further comprising generating a set of additional security questions, wherein the set of security questions includes asking the user to name canonical representatives of one or more of a plurality of abstract classes.

10. The computer-readable storage medium of claim 9, wherein the set of security questions includes asking the user to order at least two items in a category based on the user's preference.

11. The computer-readable storage medium of claim 10, wherein the category is in a plurality of categories, and wherein the plurality of categories includes one or more of:
food;
sport;
music; and
outdoor activities.

12. The computer-readable storage medium of claim 9, the method further comprising allowing the user to select the subset of security questions.

13. A computer system for verifying user identity, comprising:
a processor;
a memory;
an information-extracting mechanism configured to extract a user's information from devices associated with the user, without explicitly requiring the user to input the information manually;
a first security-question generating mechanism configured to generate a security question corresponding to an activity the user has engaged in or a place visited by the user based on the extracted information;
a first presenting mechanism configured to present to the user the security question;
a receiving and storing mechanism configured to receive and store a response from the user to the security question;
a first receiving mechanism configured to subsequently receive a request to reset the user's password;
a second presenting mechanism configured to present the security question to the requester;
a second receiving mechanism configured to receive a response from the requester to the question;
a comparing mechanism configured to compare the requester's response with the stored user response;
a response-changing mechanism configured to change a stored negative response to an affirmative response, wherein the affirmative response is verified by updated extracted information indicating that the user has engaged in the activity or visited the place; and
a response-precluding mechanism configured to preclude any change to a stored positive response irrespective of the updated extracted information.

14. The computer system of claim 13, wherein the activity includes sport and outdoor activity.

15. The computer system of claim 13, further comprising a second security-question generating mechanism configured to generate a set of additional security questions, wherein the set of security questions includes asking -the user to name canonical representatives of one or more -of a plurality of abstract classes.

16. The computer system of claim 15, wherein the set of security questions includes asking the user to order at least two items in a category based on the user's preference.

17. The computer system of claim 16, wherein the category is in a plurality of categories, and wherein the plurality of categories includes one or more of:
food;
sport;
music; and
outdoor activities.

18. The computer system of claim 15, further comprising a selection mechanism configured to allow the user to select the subset of security questions.

* * * * *